(12) United States Patent
Subramanian et al.

(10) Patent No.: US 9,983,583 B2
(45) Date of Patent: May 29, 2018

(54) AUTONOMOUS DRIVING WITH DYNAMIC SKIP FIRE

(71) Applicant: Tula Technology, Inc., San Jose, CA (US)

(72) Inventors: Ram Subramanian, Saratoga, CA (US); Louis J. Serrano, Los Gatos, CA (US); Matthew A. Younkins, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days. days.

(21) Appl. No.: 15/672,132

(22) Filed: Aug. 8, 2017

(65) Prior Publication Data

US 2018/0046184 A1 Feb. 15, 2018

Related U.S. Application Data (60) Provisional application No. 62/373,449, filed on Aug. 11, 2016.

(51) Int. Cl.
| | |
|---|---|
| *G05D 1/00* | (2006.01) |
| *F02D 17/02* | (2006.01) |
| *F02P 5/15* | (2006.01) |
| *F02D 41/00* | (2006.01) |
| *F02D 41/14* | (2006.01) |

(52) U.S. Cl.
CPC ........... *G05D 1/0061* (2013.01); *F02D 17/02* (2013.01); *F02D 41/0087* (2013.01); *F02D 41/1402* (2013.01); *F02P 5/1512* (2013.01)

(58) Field of Classification Search
CPC .. F02D 41/0087; F02D 17/02; F02D 2250/18; F02D 13/06; F02D 41/008; F02D 41/1401; F02D 2041/0012; F02D 41/1402; F02D 5041/0012; F02D 1/00; B60W 10/06; B60W 10/00; F02P 5/1522; F02P 5/1512; G05D 1/0061
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |
| 4,509,488 A | 4/1985 | Forster et al. | |
| 5,377,631 A | 1/1995 | Schechter | |
| 6,158,411 A | 12/2000 | Morikawa | |
| 6,619,258 B2 | 9/2003 | McKay et al. | |
| 7,044,101 B1 * | 5/2006 | Duty | F02D 17/02 123/198 F |

(Continued)

OTHER PUBLICATIONS

Srinivasan et al., U.S. Appl. No. 15/148,826, filed May 6, 2016.
(Continued)

*Primary Examiner* — Thomas G Black
*Assistant Examiner* — Sze-Hon Kong
(74) *Attorney, Agent, or Firm* — Beyer Law Group LLP (57) ABSTRACT

The present invention relates generally to techniques for improving fuel efficiency of a vehicle powered by an internal combustion engine capable of operating at various displacement levels. An autonomous driving unit or cruise controller selects when possible an engine torque output that corresponds to a fuel efficient displacement level. The resultant vehicle speed profile and NVH level is acceptable to vehicle occupants.

10 Claims, 9 Drawing Sheets

(56) References Cited

U.S. PATENT DOCUMENTS

| | | |
|---|---|---|
| 7,063,062 B2 | 6/2006 | Lewis et al. |
| 7,066,136 B2 | 6/2006 | Ogiso |
| 7,086,386 B2 | 8/2006 | Doering |
| 7,233,854 B2 | 6/2007 | Rayl et al. |
| 7,503,312 B2 | 3/2009 | Surnilla et al. |
| 7,512,471 B2* | 3/2009 | Nakamura ............ B60W 10/06 60/443 |
| 7,566,103 B2 | 7/2009 | Wanner et al. |
| 7,930,087 B2 | 4/2011 | Gibson et al. |
| 8,099,224 B2 | 1/2012 | Tripathi et al. |
| 8,606,483 B2 | 12/2013 | Krupadanam et al. |
| 8,886,422 B2 | 11/2014 | Sujan et al. |
| 9,086,020 B2 | 7/2015 | Tripathi et al. |
| 9,399,964 B2 | 7/2016 | Younkins et al. |
| 2007/0186898 A1* | 8/2007 | Wu ...................... F02B 29/083 123/331 |
| 2007/0299564 A1 | 12/2007 | Nelson et al. |
| 2008/0234106 A1* | 9/2008 | Maguire ............ B60W 30/186 477/169 |
| 2008/0262695 A1* | 10/2008 | Gibson ................ F02D 41/307 701/102 |
| 2008/0287253 A1* | 11/2008 | Gibson ................ B60W 30/20 477/53 |
| 2009/0118932 A1* | 5/2009 | Heap ...................... B60K 6/26 701/54 |
| 2009/0319112 A1 | 12/2009 | Fregene et al. |
| 2010/0050993 A1* | 3/2010 | Zhao ...................... F02D 17/02 123/481 |
| 2010/0100292 A1* | 4/2010 | Lv ......................... F02D 29/06 701/60 |
| 2012/0083993 A1* | 4/2012 | Shibata .............. F02D 41/1498 701/103 |
| 2012/0221217 A1* | 8/2012 | Sujan ................... B60W 10/06 701/54 |
| 2013/0074537 A1* | 3/2013 | Rollinger ............ B60H 1/3216 62/228.1 |
| 2013/0092127 A1* | 4/2013 | Pirjaberi ............. F02D 41/0087 123/406.23 |
| 2013/0096758 A1* | 4/2013 | Yuille .................. B60W 10/06 701/22 |
| 2013/0096759 A1 | 4/2013 | Breton et al. |
| 2013/0184949 A1* | 7/2013 | Saito .................... B60W 10/11 701/58 |
| 2014/0041625 A1 | 2/2014 | Pirjaberi et al. |
| 2014/0245993 A1* | 9/2014 | Weber ................... F02D 13/06 123/349 |
| 2015/0051816 A1* | 2/2015 | Glugla ............... F02D 41/0055 701/108 |
| 2015/0152795 A1* | 6/2015 | Zhao ...................... F02D 17/02 701/103 |
| 2015/0260117 A1 | 9/2015 | Shost et al. |
| 2015/0275784 A1* | 10/2015 | Whitney ................ F02D 13/02 701/102 |
| 2015/0345407 A1* | 12/2015 | Glugla ................... F02D 17/02 123/403 |
| 2016/0017824 A1 | 1/2016 | Touchette et al. |
| 2016/0021178 A1 | 1/2016 | Liu et al. |
| 2016/0032846 A1* | 2/2016 | Boyer .................... F02B 75/20 123/58.1 |
| 2016/0084178 A1* | 3/2016 | Shimizu ................ F02D 41/10 123/568.21 |
| 2016/0171894 A1 | 6/2016 | Harvey |
| 2016/0252023 A1 | 9/2016 | Srinivasan et al. |
| 2017/0114739 A1* | 4/2017 | Glugla ................... F02B 75/04 |
| 2017/0120889 A1* | 5/2017 | Choi .................... B60L 11/1851 |
| 2017/0122237 A1* | 5/2017 | Tripathi .............. F02D 41/0087 |
| 2017/0159581 A1* | 6/2017 | McCarthy, Jr. ........ F02D 17/02 |
| 2017/0254279 A1* | 9/2017 | Naidu ................ F02D 41/0097 |
| 2017/0320485 A1* | 11/2017 | Miller .................. B60W 20/40 |

OTHER PUBLICATIONS

International Search Report dated Oct. 19, 2017, from International Application No. PCT/US2017/046236.
Written Opinion dated Oct. 19, 2017, from International Application No. PCT/US2017/046236.
Cao et al., U.S. Appl. No. 15/849,401, filed Dec. 20, 2017.

* cited by examiner

AUTONOMOUS DRIVING WITH DYNAMIC SKIP FIRE

CROSS REFERENCE TO RELATED APPLICATIONS

This application claims priority of U.S. Provisional Application No. 62/373,449, filed Aug. 11, 2016, which is incorporated herein by reference.

BACKGROUND

The present invention relates generally to techniques for improving fuel efficiency of an engine. In one example, circumstances are identified during driving, in which slight reductions in engine torque output can lead to disproportionally larger fuel savings by enabling use of a lower effective displacement. The described techniques are particularly well suited for implementation in autonomous driving vehicles.

Recently, there have been extensive efforts to develop passenger vehicles with the ability to drive autonomously or semi-autonomously. Although fully autonomous vehicles are not commercially available today, enormous progress has been made in their development and it is expected that self-driving vehicles will become a commercial reality in the relatively near future.

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. The fuel efficiency of many types of internal combustion engines can be substantially improved by varying the displacement of the engine. This allows for the full torque to be available when required, yet can significantly reduce pumping losses and improve fuel efficiency through the use of a smaller displacement when full torque is not required. The most common method of varying the displacement today is deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same displacement mode. Thus, the sequence of specific cylinders firings will always be exactly the same for each engine cycle during operation in any particular variable displacement mode (so long as the engine maintains the same displacement), whereas that is often not the case during skip fire operation. For example, an 8-cylinder variable displacement engine may deactivate half of the cylinders (i.e. 4 cylinders) so that it is operating using only the remaining 4 cylinders. Commercially available variable displacement engines available today typically support only two or at most three fixed displacement modes.

In general, skip fire engine operation facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicants, has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,839,766; 8,869,773; 9,086,020; 9,120,478; 9,175,613; 9,200,575; 9,291,106; 9,399,964 and others, describe a variety of engine controllers that make it practical to operate a wide variety of internal combustion engines in a skip fire operational mode. Each of these patents is incorporated herein by reference.

The Applicant has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire operational mode. Each of these patents is incorporated herein by reference. Many of these patents relate to dynamic skip fire control in which firing decisions regarding whether to skip or fire a particular cylinder during a particular working cycle are made in real time—often just briefly before the working cycle begins and often on an individual cylinder firing opportunity by firing opportunity basis.

In some applications referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level engine operation is different than conventional variable displacement in which when the engine enters a reduced displacement operational state, a defined set of cylinders are operated in generally the same manner until the engine transitions to a different operational state.

The present application describes a variety of techniques though which the fuel efficiency of vehicles—and particularly autonomous vehicles can be improved by utilizing skip fire, dynamic firing level modulation and other variable displacement considerations in the determination of a drive profile or a specific torque request.

SUMMARY

A variety of methods, devices, controllers and algorithms for determining an operational engine torque that offers better fuel economy than a requested engine torque while delivering performance that is at least close to what would be attained by operation at the requested engine torque. Some of the described devices and approaches are particularly well suited for use in conjunction with autonomous vehicles.

In one aspect, a most fuel efficient proposed effective operational displacement is determined for delivering a desire engine output from a plurality of potentially available effective operational displacements suitable for delivering the desired engine output. A determination is then made whether there is an alternative engine torque that has a better associated fuel economy than the desired engine torque, the alternative engine torque being close to, but different than the desired engine torque. When it is determined that an alternative engine torque exists that has better fuel economy than the desired engine torque and is suitable for current use, directing operation of the engine to deliver the alternative engine torque.

In some embodiments, a determination is made whether there is an alternative effective operational displacement suitable for use under current operating conditions available that is capable of delivering close to the desired engine torque with better fuel economy than the proposed effective operational displacement. If so, the engine is operated at the alternative effective operational displacement to deliver an engine output that is lower than, but close to the desired engine output.

In another aspect an autonomous driving unit is configured to determine a requested torque using fuel economy information associated with different effective operational displacements in the determination of the requested torque. In some embodiments, the collective fuel economy of a plurality of vehicles in a platoon is utilized when determining an operational effective displacement.

In another embodiment, an autonomous vehicle is configured to operate its engine at a displacement level maximizing fuel efficiency while maintaining vehicle operation within a speed range and providing acceptable NVH characteristics.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Most skip fire engine controllers have a defined set of firing patterns or firing fractions that can be used during skip fire operation of the engine. Each firing pattern/fraction has a corresponding effective engine displacement. Often the set of firing patterns/fractions that are supported is relatively limited—for example a particular engine may be limited to using firing fractions of ⅓, ½, ⅔ and 1. Other skip fire controllers facilitate the use of significantly more unique firing patterns or fractions. By way of example, some skip fire controllers designed by Applicant facilitate operation at any firing fraction between zero (0) and one (1) having an integer denominator of nine (9) or less. Such a controller has a set of 29 potential firing fractions, specifically: 0, 1/9, ⅛, 1/7, ⅙, ⅕, 2/9, ¼, 2/7, ⅓, ⅜, ⅖, 3/7, 4/9, ½, 5/9, 4/7, ⅗, ⅝, ⅔, 5/7, ¾, 7/9, ⅘, ⅚, 6/7, ⅞, 8/9 and 1. Although 29 potential firing fractions may be possible, not all firing fractions are suitable for use in all circumstances. Rather, at any given time, there may be a much more limited set of firing fractions that are capable of delivering the desired engine torque while satisfying manufacturer imposed drivability and noise, vibration and harshness (NVH) constraints. An engine's firing pattern or firing fraction may also be expressed as an effective operational displacement, which indicates the average displacement of the engine used to generate torque by combustion of fuel under the current operating conditions.

Typically, an engine controller will determine the desired/requested engine torque based on the driver demand (e.g. accelerator pedal position) plus the load applied by any ancillary devices (e.g., air conditioner, alternator/generator, etc.). In the case of a self-driving car, the driving torque request may be made by an autonomous driving unit (ADU). During operation, the skip fire controller will determine the appropriate firing fraction/pattern for delivering the requested torque, often taking into account other relevant engine or vehicle operating parameters such as engine speed, gear, vehicle speed, etc. In some circumstances, environmental factors such as road roughness or ambient noise levels may also be utilized in the determination of the desired firing fraction/pattern. State of the art firing fraction selection generally contemplates selecting the fuel optimal firing fraction that can deliver the requested torque and meets the designated NVH and drivability requirements.

In most circumstances, for any given engine output, firing fractions/patterns having a lower firing densities are more fuel efficient than higher firing density patterns/fraction. Thus, one common approach is to select the lowest firing fraction that can deliver the requested engine torque while meeting any imposed drivability requirements and/or other design requirements.

Regardless of the number of available firing patterns/fractions, there will be times when the requested torque is slightly above an upper torque threshold associated with a particular firing fraction under the current conditions. In such circumstances, the skip fire controller would direct or recommend the use of a higher firing fraction, which is typically less fuel efficient. To give a specific example, consider particular driving conditions (e.g., operation in $3^{rd}$ gear with an engine speed of 1000 RPM), accompanied by a particular torque request (e.g. 73.5 N*m (net)). Under such conditions, a skip fire controller may recommend use of a ⅔ firing fraction which may result in a fuel flow of 0.645 grams per second. If the controller had requested a slightly lower torque, e.g., 73 N*m, the skip fire controller may have recommended the use of a firing fraction of ½, which may have a corresponding fuel flow of 0.586 grams per second. Thus, in the specific described circumstance, reducing the torque request by 0.5 N*m—which is less than 1%, can result in nearly a 10% reduction in fuel consumption.

It is believed that most auto manufacturers will be highly reluctant to implement power delivery schemes that give the driver less power than they are requesting in the described types of circumstances. This is in large part due to the perception that the driving experience will be degraded if the desired torque isn't delivered and the driver will react by changing the torque demand (e.g., by pressing the accelerator pedal further if too little torque is delivered). This subsequent reaction makes it harder to provide optimally efficient torque delivery. However, with autonomous driving, the passengers are less likely to be concerned about such minor variations, so such a tradeoff may be perfectly acceptable to an autonomous driving unit (ADU). In such situations, the ADU can improve overall fuel efficiency by considering this type of fuel efficiency implications when deciding the amount of torque to request at any given time. Of course, the same fuel efficiency considerations can be used in determining the torque request during ordinary (non-autonomous) driving if the tradeoff is acceptable to the driver/controller designer. This application describes techniques for improving fuel economy by taking advantage of these types of tradeoffs—particularly during autonomous driving.

There may also be circumstances where the total fuel consumption associated with a trip can be reduced by providing more torque than would ordinarily be requested. For example, using the conditions discussed above, operating at a firing fraction of ½ to deliver a requested torque of 72 N*m may be less efficient than delivering 73 N*m of torque if the manifold pressure needs to be reduced to facilitate delivery of 72 N*m of torque (due to increased pumping losses). In such circumstances, an ADU may elect to request a slightly higher torque to improve fuel efficiency. Techniques for taking advantage of these types of fuel efficiency gains are also described.

Figure 1:
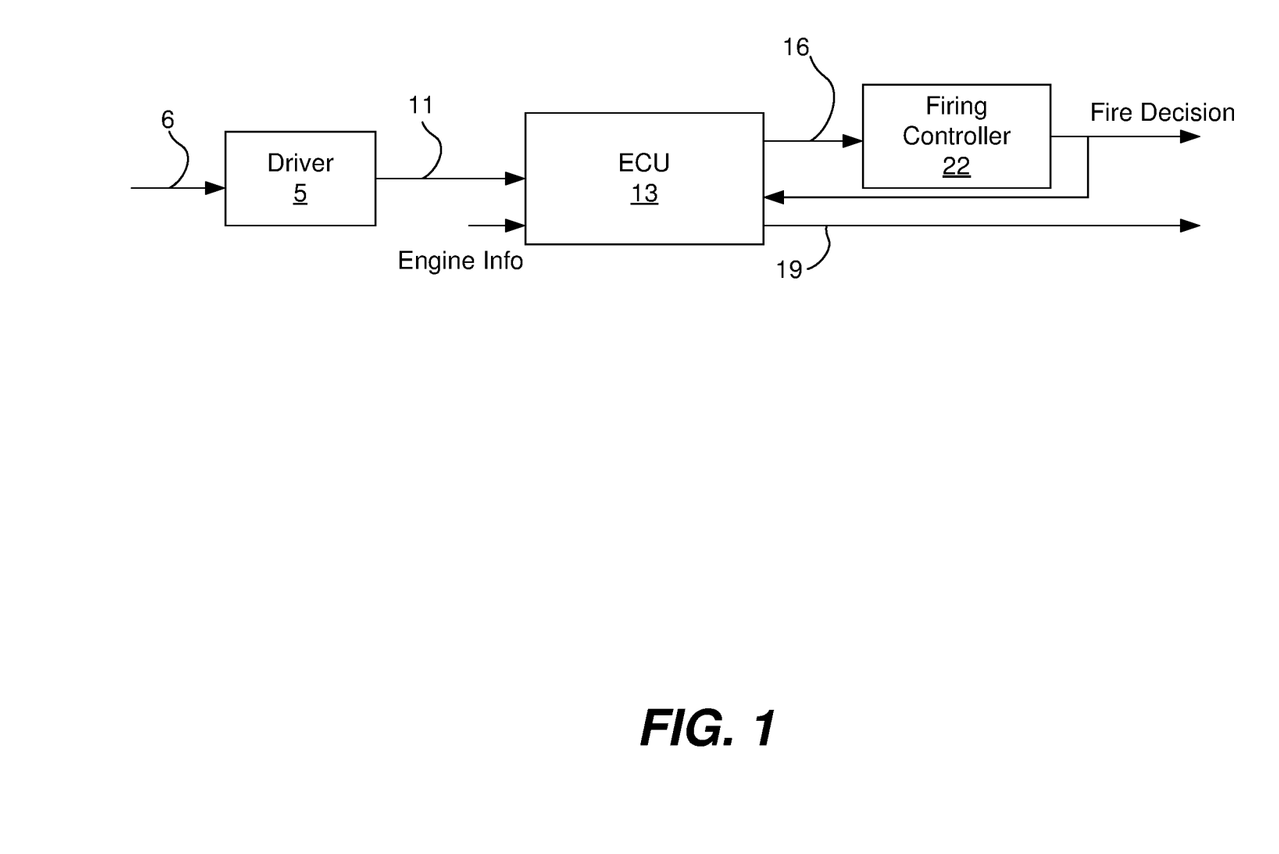
FIG. 1 a block diagram illustrating the architecture of a representative skip fire engine controller.

Referring next to FIG. 1, a high level overview of the logic of state of the art, skip fire engine control will be described. In the illustrated embodiment, a driver 5 senses and processes real world information 6 and depresses an accelerator pedal to control the output of the engine. The accelerator pedal position may effectively be treated as a torque request 11 by a skip fire engine controller or engine control unit (ECU) 13. The ECU 13 determines an appropriate firing fraction 16 and other associated vehicle and engine operating parameters 19 such as torque converter slip, transmission gear, throttle position, valve timing, etc., that are suitable for delivering the requested torque. The selected firing fraction 16 is used by a firing controller 22 to determine the specific timing of firings. The firing decisions are reported to the skip fire engine controller which may utilize knowledge of the specific firing decisions in the control of any engine, powertrain or vehicle parameters that are based in any part on specific firing decisions or cylinder firing history. Examples of parameters that will be affected by specific firing decisions and/or firing history include valve control to control cylinder deactivation/activation, fuel injection decisions, injected fuel mass, and spark timing.

Figure 2:
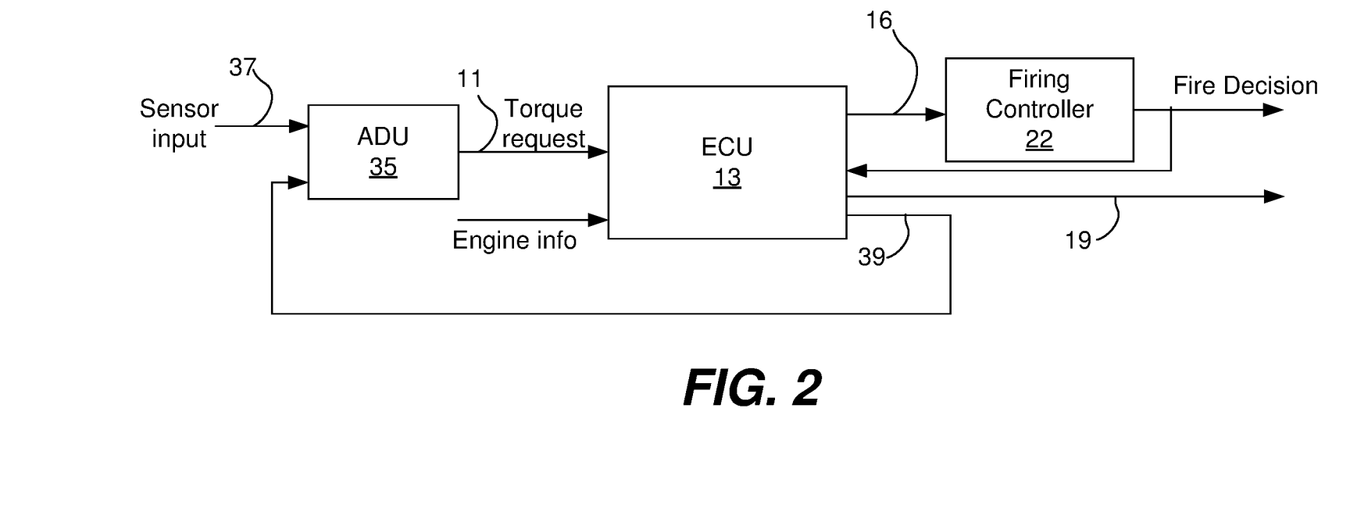
FIG. 2 is a block diagram illustrating the architecture of an autonomous driving engine control scheme utilizing skip fire engine control in accordance with one embodiment.

FIG. 2 is a high level overview of the logic of autonomous driving control using skip fire engine control in accordance with one particular embodiment that is generally analogous to FIG. 1. In this embodiment, an ADU 35 effectively replaces the driver in that it receives inputs 37 from sensors or other sources that sense real world information concerning its local environment. Such inputs may include information obtained by communicating with other vehicles, from a global position system (GPS), from traffic signals, etc. The ADU determines the driving torque requests based on its proprietary algorithms In some embodiments, the ADU is capable of fully controlling operation of the vehicle in a self-driving mode. This can involve full trip planning in a driverless vehicle, or an auto-pilot mode in a vehicle that can also operate under manual control. More generally, the ADU can be any device or mode that determines the driving torque request. For example, an advanced cruise control device can serve as an ADU in the context of this embodiment, since it governs the driving torque request.

The ADU 35 processes all of its relevant inputs and provides a driving torque request 11 to a skip fire engine controller (ECU) 13 based on those inputs. The skip fire engine controller 13 and the firing controller 22 operate substantially the same as described above with respect to FIG. 1. One difference is that the skip fire engine controller 13 can provide the ADU with information indicative of the expected fuel efficiency associated with different torque requests based on the current engine state (i.e., under the current operating conditions) as represented by line 39. Such torque/fuel efficiency data can then be used by the ADU to incorporate skip fire based fuel efficiency considerations in the determination of the initial driving torque request 11. The ADU may operate the firing cylinders at an operating point at or near their minimum brake specific fuel consumption (BSFC) to maximize fuel efficiency. For example, the fired cylinders may operate with a BSFC within 2%, 5%, 10% or 20% of the minimum BSFC.

Figure 3:
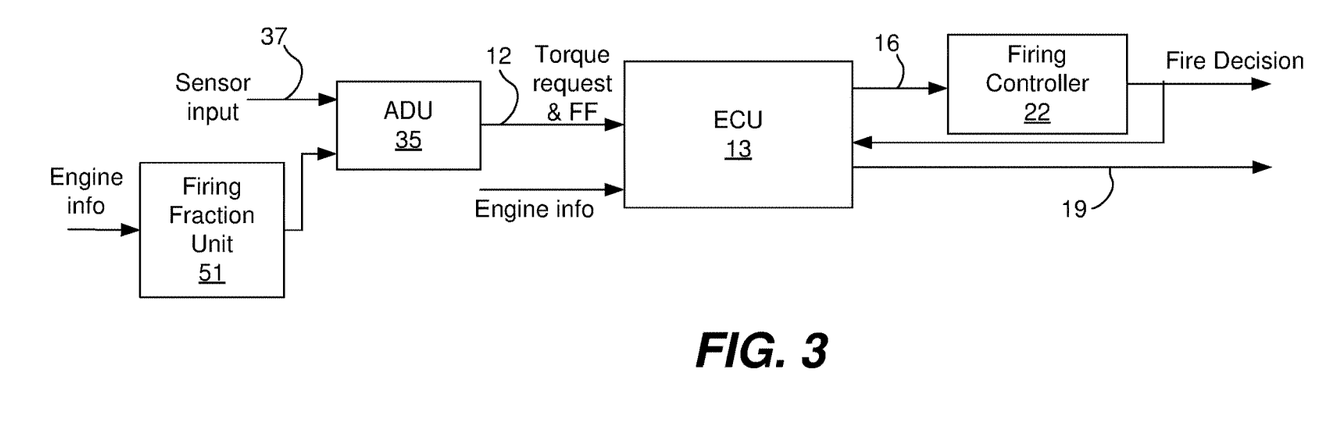
FIG. 3 is a block diagram illustrating the architecture of an autonomous driving engine control scheme utilizing skip fire engine control in accordance with a second embodiment.

FIG. 3 provides a high-level overview of the logic of an alternative ADU based control scheme. In this embodiment, a firing fraction unit 51 and the ADU 35 cooperate to determine the desired firing fraction, which is provided to the ECU 13 together with the requested torque as represented by line 12. The ECU 13 informs firing controller 22 of the desired firing fraction and directs the various engine settings appropriately to operate the engine in a skip fire manner that delivers the desired torque.

In the illustrated embodiment, the firing fraction unit 51 determines the firing fractions that are available for use at the current operating conditions and identifies the specific firing fractions that should be used in conjunction with different torque requests. The firing fraction unit provides this information, together with corresponding fuel consumption data to the ADU. The ADU utilizes this fuel consumption information in the determination of the appropriate torque request. The desired torque is then sent to the ECU together with the associated firing fraction which was provided by firing fraction unit 51.

When making skip fire based fuel economy decision, it is important that the torque request being considered be the total torque request as opposed to simply the drive torque request (which is the torque intended for the drivetrain). The total torque request includes any accessories torque loads (e.g. the load(s) applied by an air conditioning unit, an alternator, etc.). In hybrid vehicles of any type (including full-hybrids, mild-hybrids, mini-hybrids, micro-hybrids etc.), it would also include any torque load (or torque addition) imparted by any motor/generator(s), etc. A potential advantage of the architecture of FIG. 2 is that the ECU has knowledge of the torque demands of the accessories and can therefore readily include the influence of such loads in the firing fraction and fuel consumption determinations. When the fuel efficiency data comes from another source such as firing fraction unit 51, the ADU would typically be responsible for knowing and compensating for the torque loads imparted by the accessories, which tends to complicate ADU design.

Although only a couple of specific skip fire control architectures are explicitly shown, it should be appreciated that the described functionality can be achieved using a variety of other control architectures as well. In different embodiments, any of the ADU functionality, the engine control functionality, the firing fraction determining functionality, the fuel information determining functionality, and the firing control functionality may be combined into integrated units, or their respective functionalities may be divided among multiple components, which may be integrated in any manner deemed suitable for a particular implementation. Independent of the exact implementation architecture, accessory torques can be managed in conjunction with engine torque to optimize vehicle fuel consumption over a predicted or actual drive profile. For example, if the most optimal combination of vehicle speed and firing density results in a torque that is too high or too low to hold the given vehicle speed, torque can be added/subtracted by scheduling the alternator, hybrid motor, air conditioning system, generator, etc., appropriately.

Figure 4:
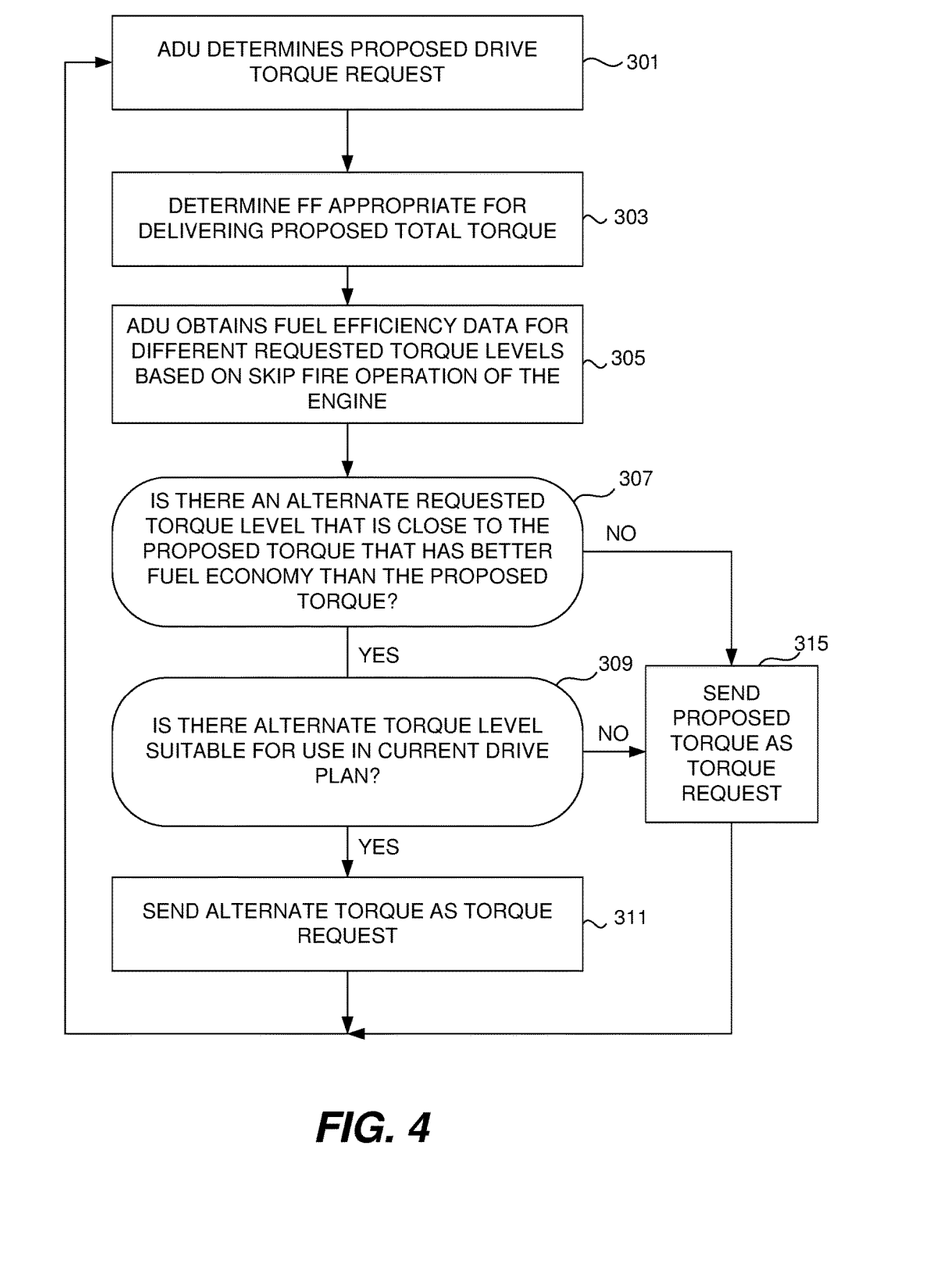
FIG. 4 is a flow chart illustrating a representative method of determining a torque request based utilizing skip fire based fuel efficiency considerations.

Referring next to FIG. 4, a non-exclusive method for determining the torque request based in part on skip fire related fuel economy considerations will be described. In the illustrated embodiment, in step 301, an ADU 35 determines a proposed torque based on a drive plan in conjunction with current and/or expected driving conditions. The sophistication of the proposed torque calculation can vary widely from implementation to implementation. In some embodiments the proposed torque is based in large part on a desired vehicle speed, a very simple version of which could be based on cruise control concepts. More sophisticated ADUs may make a torque determination utilizing any sensed parameters or information available to the vehicle from external networks and/or from nearby wirelessly connected vehicles.

For any given torque request, the most fuel efficient firing fraction suitable for delivering that requested torque under the current operating conditions while staying within desired drivability constraints can readily be determined as represented by step 303. By way of example, in the embodiment of FIG. 2, the engine controller 13 is arranged to determine the operational firing fraction based on a requested torque. In the embodiment of FIG. 3, firing fraction unit 51 determines the firing fraction that would be appropriate for different level torque requests. Once the firing fraction and torque request are known, the associated fuel efficiency information can readily be determined. More generally, for any given operating conditions (e.g., engine speed, gear, etc.) the firing fraction that would be appropriate for any given torque request, as well as the corresponding fuel consumption characteristics can readily be estimated.

In step 305 the ADU obtains information regarding the fuel efficiency associated with different level torque requests. This fuel economy data may be obtained from a variety of different sources. For example, in the embodiment of FIG. 2, the fuel efficiency data for different torque requests is provided by the engine controller 13. In other embodiments a separate firing fraction calculator 51 may be arranged to identify a set of potential firing fractions and estimate their associated fuel economy characteristics as illustrated in the embodiment of FIG. 3. In still other circumstances, the ADU can include algorithms or have access to lookup tables that estimate the expected fuel consumption rates (or other suitable measures of fuel economy) at different requested torque levels based on current operating conditions (e.g., engine speed, gear, various engine settings, etc.).

The ADU utilizes the fuel economy information to determine whether there is an alternative torque request level that has an output level close to the proposed torque request that has better fuel economy than the proposed torque request in step 307. If so, the ADU determines whether the alternative torque level is suitable for use in the current drive plan in step 309. If an alternative, more fuel efficient torque level is deemed suitable for use, the alternative torque level is sent as the torque request as represented by step 315. If there are no close alternative torque levels that are more fuel efficient (as determined in step 307), or if such alternative torque levels are not deemed suitable for use under current conditions (as determined in step 309), the proposed torque is sent to the ECU as the torque request as represented by 311. In some cases, the torque level associated with the firing fraction may operate the engine at or near its acceptable NVH limit. Generally, the firing cylinders will operate at or near their minimum BSFC value.

It should be appreciated that the thresholds associated with what alternative torque levels might be worth considering and the determination of what alternative torque levels are suitable are both relative determinations that may vary widely based on the sophistication of the ADU. For example, in some embodiments, the ADU can be arranged to only look at alternative torque requests that are within a prescribed threshold range of the requested torque—e.g., within X % of the expected torque, as for example, within 1%, 2% or 5%, with an enhanced fuel efficiency gain. Often relatively small changes in torque output may be perfectly acceptable, but in other cases such as when merging with traffic, when the vehicle speed starts to deviate too much from a desired ADU determined speed, or when the vehicle is moving in heavy traffic, variations in the torque request may be less acceptable. As described below the ADU may also consider turning on or off an auxiliary load, such as an air conditioner.

In other circumstances, longer term planning may be involved. For example, if a connected vehicle knows upcoming road conditions such as hills, areas of congestion, stop signs or red lights, changes in the speed limit, etc., those variables can be incorporated into the proposed torque calculation or a drive plan as appropriate. For example if a stop or slow down is expected ahead, the ADU may determine that the torque can be reduced earlier than it might otherwise have been. To give a specific example, if the ADU knows that an upcoming traffic light will be red for a given window of time it may have a great deal of latitude in determining the drive plan between the current location and the traffic light which can lead to additional fuel savings. The specific torque request values utilized during this period may be determined based on skip fire specific fuel economy information.

Additionally, for vehicles with regenerative braking, the braking speed versus distance profile may be altered to allow an increase in regenerative braking. For example, DCCO (decel fuel cut-off) may be entered earlier. The use of skip fire control in conjunction with DCCO is described in U.S. patent application Ser. No. 15/009,533, which is incorporated herein by reference. Similarly, the flexibility inherent in planning for other traffic and road conditions, including upcoming hills, speed limit changes, traffic congestion, etc. can lead to even greater fuel savings. In this way, even negative torque requests can be accommodated. By taking skip fire based fuel economy considerations into account when determining the drive plan torque requests, the overall fuel efficiency for a trip can be improved.

In making its torque request determinations, the ADU may rely on a wide variety of different inputs from both sensors and other sources. These may include GPS and map data that can provide a wide variety of information including the current position of the vehicle, the surrounding topography (e.g., upcoming hills, etc.), speed limits, traffic controls such as stop signs, etc. A variety of sensors such as cameras, LIDAR (Light Imaging, Distance, And Ranging) and RADAR (Radio Detection And Ranging) can provide information about surrounding vehicles and obstacles including information about their relative speeds. Connected vehicles facilitate communication between vehicles (e.g. Vehicle to Vehicle communications) and communications with infrastructure (Infrastructure to Vehicle communications or vice versa)—which can provide a wide variety of additional information that is useful to the ADU—including, for example, the expected status of traffic controls (e.g., traffic light timing), vehicle trajectory (e.g. changes in slope or direction), road conditions (e.g., there is an accident or slow traffic ahead, there is ice or other slippery road conditions ahead, etc.), knowledge about what other vehicles are doing or are about to do (e.g., the vehicle ahead is about to speed up or slow down, switch lanes, etc.), the ability to draft or platoon vehicles in tandem to reduce air resistance. Any of these variables can be relevant to the determination of a drive plan. Of course, the types of information that can be obtained and used in conjunction with the formation of a drive plan and/or instantaneous torque request decisions is only limited by the imaginations of ADU and connected vehicle systems designers. By knowing this type of information, the ADU can better predict the expected driving actions, which when combined with the knowledge of skip fire based fuel efficiency data, can facilitate operating the vehicle in a manner that significantly improves fuel economy. In some cases the engine may never even be operated, for example, if the engine is off and the ADU determines that only a small creep is required then the electric motor may be driven to supply the necessary motive power while leaving the engine off.

Figure 5:
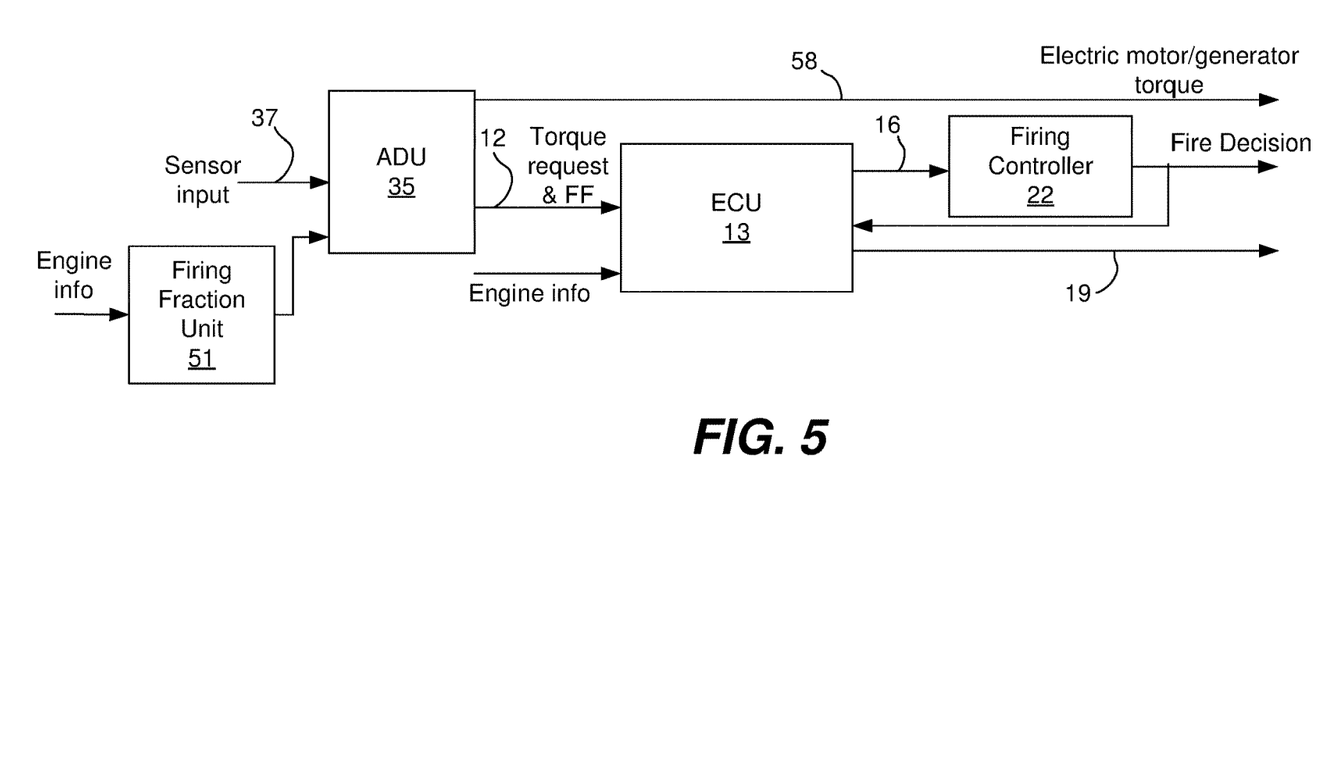
FIG. 5 is a block diagram illustrating the architecture of an autonomous driving engine control scheme utilizing skip fire and micro-hybrid engine control in accordance with a third embodiment.

Referring next to FIG. 5, yet another embodiment will be described. This embodiment is quite similar to the embodiment of FIG. 3, but is used in conjunction with a hybrid electric vehicle having an electric motor/generator that is used in conjunction with skip fire operation of an internal combustion engine. Any type of electric motor/internal combustion engine hybrid can be utilized including, but not limited to, hybrids, mild hybrids and micro hybrids. An advantage of the hybrid/skip fire approach is that when fuel efficiency gains can be had by slightly reducing the output of the engine, the electric motor can be used to make up the shortfall such that the entire desired output can be attained. Thus, when the ADU 35 determines that fuel efficiency of the engine can be improved by reducing the engine torque request it can send an instruction 58 to an electric motor to add the appropriate amount of torque to the drive train to ensure that the full desired torque is delivered. This can be particularly fuel efficient when the energy supplied by the electric motor is derived from regenerative braking or other low cost energy sources (such as plug-in power or solar panels integrated into the vehicle).

In some instances, the generator functionality of an electric motor/generator or a separate generator may be used to subtract torque from the drivetrain when it is determined that it would be more fuel efficient to provide more torque than required at any given time. Although this approach can work well in some circumstances, the round-trip efficiency of the generator/motor and the storage system must be taken into account when determining whether subtracting torque from the drivetrain to generate electricity is more fuel efficient overall then simply operating at the lower requested torque level. The decision whether to subtract torque from the drivetrain may also consider the current charge state of the battery or capacitor energy storage device.

Figure 6:
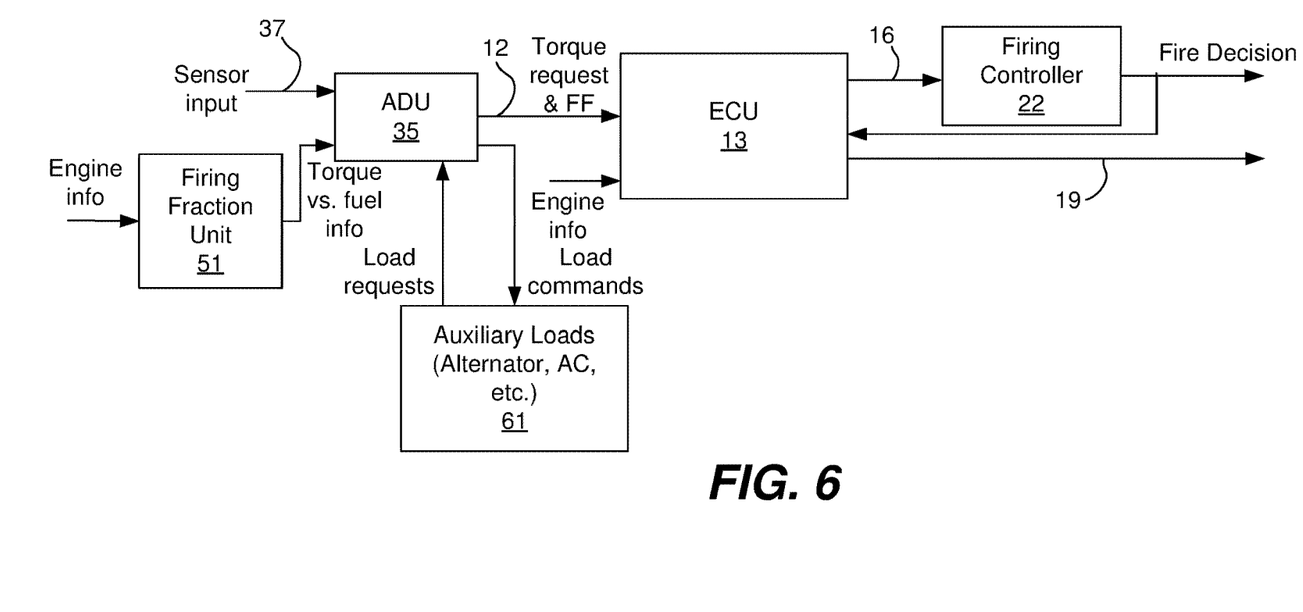
FIG. 6 is a block diagram illustrating the architecture of an autonomous driving engine control scheme utilizing skip fire engine control in accordance with a fourth embodiment.

Yet another embodiment is illustrated in FIG. 6. This embodiment is also similar to the embodiment of FIG. 3, except that the ADU exercises discretionary control over certain auxiliary device(s) 61. In practice, there may be a variety of different auxiliary devices that introduce engine loads. Two of the most common load sources that tend to involve larger loads are the alternator/generator and the air conditioning unit. When such devices are in use, their respective loads may increase the torque request enough to require transition to a less fuel efficient firing fraction. Consider, for example, an operating situation somewhat similar to the example above where the drive torque request is 72 N*m (net)) and an alternator applies an additional load of 1.5 N*m resulting in a total torque request of 73.5 N*m (net)) as discussed in the example above. In such a circumstance, the fuel consumption can be improved significantly by simply commanding the alternator to reduce its load (e.g., to apply a load of 1.0 N*m rather than 1.5 N*m). When the drive torque request later changes to a level that is not near a firing fraction efficiency boundary, the alternator load can be increased back to its desired level, or even to a higher level that makes up for some of the deficit that occurred during the torque reduction.

It should be appreciated that the torque management can also go the other way where a hybrid alternator (generator) draws power from the drive train to generate electricity that can be stored in a battery or capacitor. For example, a drive torque request of 71 N*m can be satisfied with a more fuel efficient 72 N*m generated by the engine, the hybrid alternator (generator) taking up 1 N*m of the torque for battery charging.

In many driving circumstances, this type of "altered" auxiliary device control based on skip fire fuel efficiency considerations may be virtually undetectable to the vehicle passengers.

It should also be appreciated that with some of the described approaches, the drain from the auxiliary device (e.g., air conditioner or alternator) can be managed to most efficiently utilize small changes in torque that improve overall fuel efficiency, i.e. the control scheme is driving the load rather than the load driving the control. In a somewhat analogous manner the ADU can determine that a change in the desired engine output torque will likely be required sometime in the near future. For example, the ADU can determine that the vehicle may soon be slowing, and thus require less engine torque, or may be approaching a hill, and thus require more engine torque. In these cases, the ADU may inhibit a gear shift or firing density change if it determines that it is likely the vehicle will operate in this new operational state for only a short time period.

Figure 7:
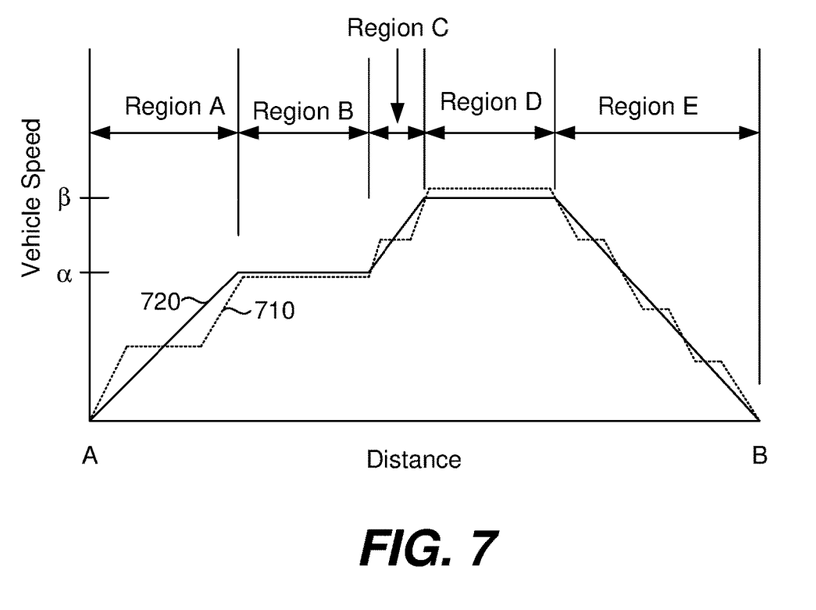
FIG. 7 is a representative drive profile associated with a representative trip.

FIG. 7 shows a representative drive profile associated in traveling from point A to point B. In this example, the drive profile is divided into 4 regions. Region A is the initial acceleration to a speed α. Region B is nominally steady state operation at speed α. Region C is acceleration to a new higher speed β. Region D is nominally steady state operation at speed β. Region E is deceleration to a stop at point B. Curve 720 shows an exemplary curve for a prior art autonomous control system. The vehicle accelerates and decelerates smoothly and operates at the prescribed speeds of α and β.

Curve 710 is an exemplary drive profile of an autonomous vehicle according to an embodiment of the present invention. In this case the accelerations and decelerations may not be uniform. The vehicle may dwell at certain speeds during the accelerating or decelerating regions, A, C, and E, where skip fire operation of the engine provides particularly improved fuel economy. Within these accelerating and decelerating regions maximum acceleration/deceleration may be limited to provide acceptable NVH characteristics. The rate of change of acceleration, known as jerk, may also be limited to provide acceptable NVH characteristics. Also, during the steady state operating periods, regions B and D, the vehicle may operate at a speed slightly different than α or β where fuel efficiency is higher than if the vehicle were operated at exactly α or β. The time to travel between point A and B, represented by the area under curves 710 and 720, may be similar, meaning that operating a vehicle at more fuel efficient firing fractions may have little or no impact on the drive time between points A and B.

There are many examples, such as open road freeway driving, when a driver wants to operate a vehicle at a nominally constant speed at or near the speed limit. In a cruise controlled system or prior art autonomous vehicle system the cruise control or ADU would attempt to control the vehicle to this desired speed. The desired speed may not however coincide with an efficient firing density in a skip fire controlled engine. To improve fuel economy, the cruise control or ADU can instead of attempting to operate the vehicle at a fixed speed, control vehicle speed within a desired range, such as ±1 mph, ±2 mph or some percentage of the nominal speed ±1%, ±2%, etc. It should be appreciated that the operating range may not be symmetric; for example, the speed variation may be +0% and −2% about some desired operating speed, such as the local speed limit.

Figure 8:
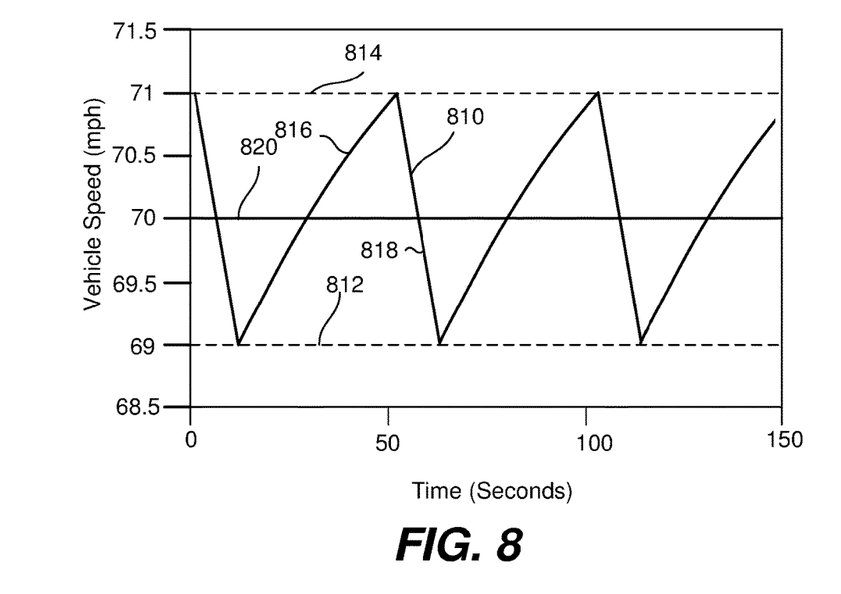
FIG. 8 shows a representative drive profile associated with controlling in a speed range rather than control to a fixed constant speed.

FIG. 8 shows a representative drive profile associated with controlling in a speed range rather than control to a fixed constant speed. The speed range may be based on the speed limit where the vehicle is operating, on drafting or being drafted by another vehicle, or on some other factor. Curve 820 shows an exemplary curve for a prior art autonomous control system. The speed is controlled at a constant value of 70 mph in this example. Vehicle speed 810 is an exemplary drive profile of an autonomous vehicle according to an embodiment of the present invention. The vehicle speed 810 is allowed to vary between an upper limit 814 and a lower limit 812. In this example, speed control is within a ±1 mph range about the nominal speed of 70 mph, so the speed oscillates between 69 and 71 mph. In this example the period of the speed oscillation is about 50 seconds, corresponding to a frequency of 0.02 Hz. Oscillations in this frequency range, such as frequencies less than approximately 0.5 Hz, tend to generate less undesirable NVH than frequencies immediately above this range. Generally, the vehicle acceleration and deceleration within the speed range may be limited to provide acceptable NVH characteristics. Likewise, a rate of change of the speed range may be limited to provide acceptable NVH characteristics.

In the accelerating portions 816 of curve 810 the engine is operating at a first firing fraction and in the decelerating portions 818 the engine is operating at a second firing fraction. The second firing fraction is less than the first firing fraction and thus generally produces insufficient torque to maintain the vehicle speed, hence the vehicle deceleration. In some cases, the second firing fraction may be zero, corresponding to a decel cylinder cut off condition (DCCO) where no fuel is consumed in that portion of the drive cycle. Generally, the lower the second firing fraction the steeper the deceleration portion 818. The first and second firing fraction may be chosen to maximize fuel efficiency consistent with maintaining acceptable NVH performance.

In some embodiments, a driver can improve fuel efficiency by selecting an economy mode or accepting slightly lower average speeds and a slightly longer trip time. That is a driver may input an overall travel time between a trip origination point and a trip destination point, which is different than the travel time obtained by driving always at the speed limit. For example, when an entire trip is known to and planned by the ADU, a driver may indicate to the ADU that he/she is willing to accept a drive profile taking 1, 2 or 5 minutes (or 1%, 2%, 5%) or some other value longer than a drive profile that always operates at the speed limit. This flexibility may allow the ADU to operate the engine more often at favorable effective engine displacements improving fuel economy. Similarly, in some embodiments a driver or an ADU may accept slightly higher NVH levels, which can allow use of higher efficiency firing densities and less torque converter slip. Improved fuel economy may be interpreted as using less total fuel in moving the vehicle from point A to point B in some desired time.

Much of the previous description has focused on methods to improve fuel economy for an autonomously controlled vehicle traveling in isolation. There are also control methods to improve fuel economy using vehicle-to-vehicle communication. One well know method to improve fuel economy by reducing air resistance is drafting or platooning of vehicles (one or more vehicles drafting each other). Under driver control, such driving strategies are often dangerous because of the risk of a following vehicle colliding with a lead vehicle in the event of sudden braking of the lead vehicle. With vehicle-to-vehicle communications such risks are greatly reduced, since the lead vehicle can communicate its braking essentially instantaneously to all following vehicles and thus avoid rear end collisions.

If one or more of the vehicles in a platoon have engines capable of skip fire operation various strategies may be used to improve the collective fuel economy of all vehicles in the platoon. For example, consider first a platoon that consists of two vehicles, a lead vehicle operating at a constant speed without skip fire control and a following vehicle with skip fire control. The ADU of the following vehicle may minimize fuel consumption by considering efficiency gains from drafting simultaneously with those obtained by operating at a fuel efficient firing density. This may result in the following vehicle operating on alternating firing fractions as shown in relation to FIG. 8 and the distance between the lead vehicle and following vehicle moving back and forth in conjunction with the alternating firing fractions. In other cases, where the vehicle speed coincides with a fuel efficient firing density such shifting in firing density may not be necessary. That is that one or both vehicles may deliberately choose a speed that corresponds with a fuel efficiency firing density so that the vehicles maintain an approximately constant separation. Alternatively, if both vehicles have ADUs, they could collectively choose a speed that maximizes the collective fuel efficiency. It should be appreciated than in many drafting situations the lead vehicle also experiences a fuel efficiency gain, so all the benefits of drafting do not flow solely to the following vehicle(s).

Figure 9:
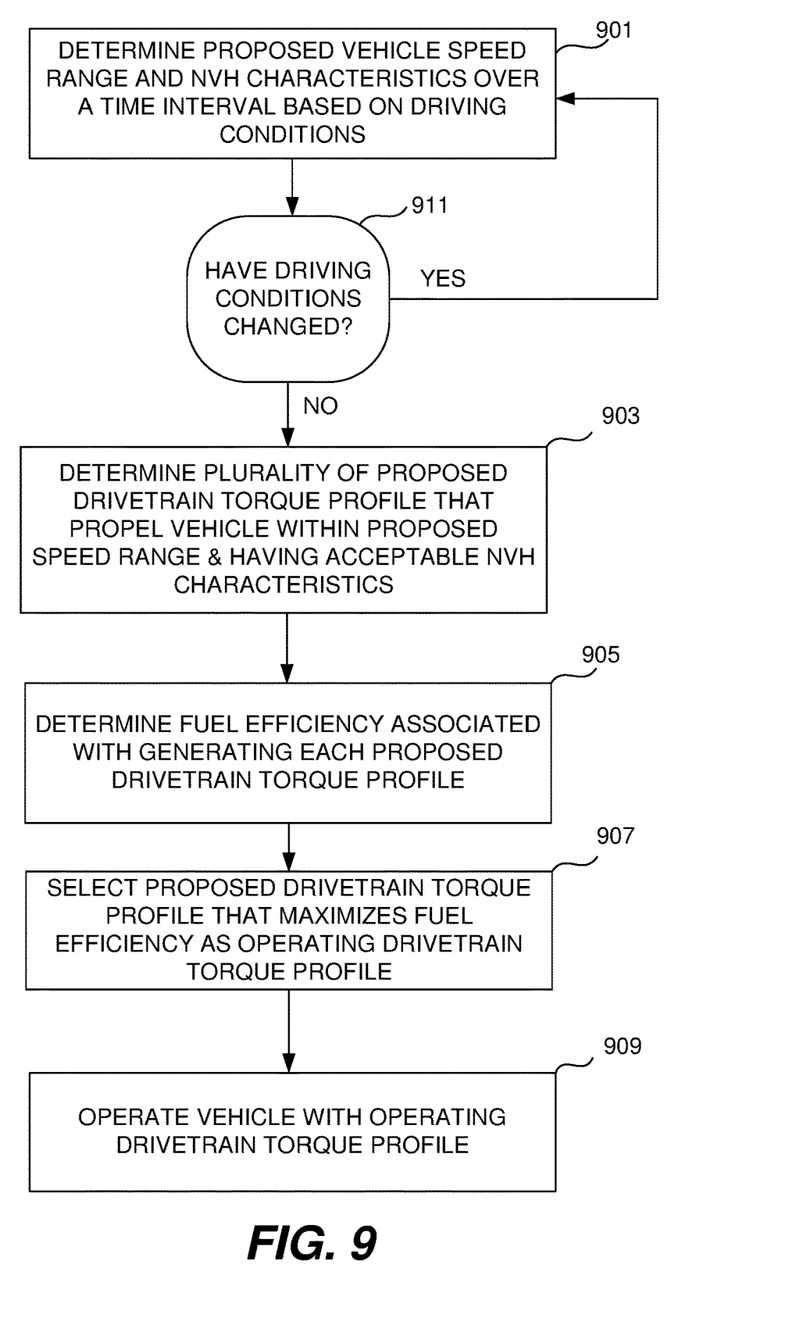
FIG. 9 is a flow chart illustrating a representative method of determining a an operating torque profile that maximizes fuel efficiency based on a proposed speed range, acceptable NVH characteristics, and time interval.

In the case of a two vehicle platoon with both vehicles capable of skip fire control, the ADU's of the two vehicles may cooperatively determine a platoon speed which optimizes fuel efficiency for the overall platoon. This may result in each vehicle in the platoon operating at a suboptimal level. Likewise, for platoons having more than two skip fire controlled vehicles, the vehicle's ADU's can communicate between them and operate the platoon in a most fuel efficient manner Another embodiment of the invention is shown in FIG. 9, which depicts a non-exclusive method for control of an autonomous vehicle. In this embodiment, an autonomous driving unit (ADU) determines a proposed speed range and acceptable NVH characteristics over a time interval as illustrated in step 901. The time interval used may vary with the driving conditions. For example, when driving on an uncongested freeway the ADU may determine the proposed vehicle speed range over tens of seconds and even minutes. By contrast in city driving, or under congested conditions, the time interval may be less than a second or even faster than human response times, which are several tenths of a second. The ADU continually assesses whether the driving conditions have changed as illustrated in step 911. If the ADU detects a change in driving condition, control may revert to step 901 where a new speed range, acceptable NVH characteristics, and time interval are determined. Changes to the driving conditions may occur for many reasons, such as the appearance of a road hazard, a stopped or slow vehicle, a pedestrian, an emergency vehicle, precipitation, limited visibility, icy roads, a changing stop light, road construction, speed limit changes, etc. It should be appreciated that if the change in driving conditions warrants an immediate, decisive response, such as emergency braking to avoid a collision, the ADU will prioritize collision avoidance over fuel efficiency or NVH considerations and instantaneously response to the situation.

In step 903, the ADU determines a plurality of proposed drivetrain torque profiles that will propel the vehicle within the proposed speed range and have acceptable NVH characteristics over the time interval. In step 905 the fuel efficiency of various proposed drivetrain torque profiles is determined. The proposed drivetrain torque profiles may utilize different firing densities, firing fractions, or displacement levels. In some cases, the fuel efficiency of all proposed drivetrain torque profiles may be determined; however, it is likely that the ADU may determine that many torque profiles will have poor fuel efficiency without explicitly calculating their efficiency. Since these drivetrain torque profiles will not be used to operate the vehicle, the ADU does not need to devote computational resources to determining their precise fuel efficiency. Generally, a drivetrain torque profile that utilizes cylinders' firing at or near their minimum BSFC point will maximize fuel efficiency. It should be appreciated that over the time interval the firing density may vary so long as the constraints on vehicle speed and NVH established in step 901 are maintained. In step 907 the proposed drivetrain torque profile that provides the most fuel efficiency operation is selected as the operating drivetrain torque profile. In step 909 this operating drivetrain profile is used to propel the vehicle.

Although only a few embodiments of the invention have been described in detail, it should be appreciated that the invention may be implemented in many other forms without departing from the spirit or scope of the invention. The invention has primarily been described in the context of Applicant's dynamic skip fire operation of an engine in which firing decisions are dynamically made on a firing opportunity by firing opportunity basis using an accumulator or other mechanism tracks the portion of a firing that has been requested, but not delivered, or that has been delivered, but not requested. However, the described techniques are equally applicable to managing transitions between any different skip fire firing fractions or between a skip fire firing fraction and all cylinder operation. While the invention has generally been described as controlling an engine to maximize operation at fuel efficient firing density, other factors also contribute to overall vehicle efficiency. In particular, torque converter slip and transmission gear (or speed ratio for a continuously variable transmission) can be managed in conjunction with firing density to operate a vehicle in a manner that provides acceptable NVH performance while maximizing fuel efficiency.

Additionally, it should also be appreciated that the same principles can be applied to most any system that improves fuel consumption by varying the displacement of an engine. This can include standard variable displacement operation of an engine where decisions are made to transition between displacement states having different numbers of cylinders (e.g., transitions between 4 and 8 cylinder operation or between 3, 4 and 6 cylinder operation). It may be used in transitions in and out of skip fire operation from/to all cylinder operation, a fixed displacement or DCCO. One such example would be transitions from all cylinder operation of a 3 cylinder engine to a rolling cylinder deactivation mode with every other cylinder being fired. It can also include multi-level engine operation where different cylinders are fired at different, dynamically determined output levels, as described, for example, in U.S. Pat. No. 9,399,964 which is incorporated herein by reference or in any other dynamic firing level modulation operating scheme. Similar techniques may also be used to manage effective displacement transitions in variable stroke engine control in which the number of strokes in each working cycle are altered to effectively vary the displacement of an engine.

In dynamic skip fire and various other dynamic firing level modulation engine control techniques, an accumulator or other mechanism may be used to track the portion of a firing that has been requested, but not delivered, or that has been delivered, but not requested. However, the described techniques are equally applicable to engines controlled using other types of skip fire or firing level modulation techniques including various rolling cylinder deactivation techniques. Therefore, the present embodiments should be considered illustrative and not restrictive and the invention is not to be limited to the details given herein, but may be modified within the scope and equivalents of the appended claims.

What is claimed is:
1. A method of controlling the operation of an engine, the method comprising:
   determining a desired engine torque;

determining a proposed effective operational displacement from a plurality of potentially available effective operational displacements suitable for delivering the desired engine torque, the proposed effective operational displacement being the most fuel efficient effective operational displacement among the plurality of potentially available effective operational displacements;

determining whether there is an alternative effective operational displacement available that is capable of delivering an alternative engine torque that has a better associated fuel economy than delivering the desired engine torque at the proposed effective displacement, the alternative engine torque being different than the desired engine torque but within a designated range of the desired engine torque; and when it is determined that an alternative engine torque that is within the designated range of the desired engine torque exists that has better fuel economy than the desired engine torque, determining whether the alternative engine torque is suitable for current use, and if so, directing operation of the engine to operate at the alternative effective operational displacement to deliver the alternative engine torque.

2. A method as recited in claim 1 wherein the engine has a multiplicity of effective operational displacements and at least one of the multiplicity of effective operational displacements that is capable of delivering the desired engine torque is not included in the set of potentially available effective operational displacements under current operating conditions based on NVH or drivability concerns.

3. A method as recited in claim 1 wherein the desired engine torque includes a desired drive torque component indicative of an amount of torque desired to propel a vehicle and a desired auxiliary torque component indicative of an amount of torque desired to power operation of one or more auxiliary devices, the method further comprising:

automatically reducing the auxiliary torque allocated to the one or more auxiliary devices by an amount that at least partially compensates for the reduction in torque caused by operation at the alternative engine torque.

4. A method as recited in claim 3 wherein the one or more auxiliary devices that is allocated a reduced amount of torque includes at least one selected from the group consisting of an air conditioner, an alternator, and a generator.

5. A method as recited in claim 1 wherein:

the engine is a power source for a vehicle controlled by an autonomous driving unit, the engine being a part of a powertrain for the vehicle;

the desired engine torque includes a desired drive torque component indicative of an amount of torque desired to propel the vehicle; and operation at the alternative engine torque causes less than the desired drive torque to be delivered by the powertrain.

6. A method as recited in claim 1 wherein the engine is a power source for a hybrid vehicle that also includes an electric motor/generator and wherein the difference between the torque generated by operation at the alternative engine torque and the desired engine torque is supplied by the electric motor/generator to thereby cause the engine and the electric motor/generator to cooperatively deliver a torque equivalent to the desired engine output.

7. A method as recited in claim 1 wherein the alternative effective operational displacement must have a specific fuel consumption that is at least a designated amount or percentage better than the proposed effective operational displacement for the alternative effective operational displacement to be deemed suitable for use under the current operating conditions.

8. A method as recited in claim 1 performed while the engine is operating in a skip fire operational mode and the proposed effective operational displacement and the alternative effective operational displacement correspond to different operational firing fractions, the firing fraction for the alternative effective operational displacement being lower than the firing fraction for the proposed effective operational displacement.

9. A method of controlling the operation of an engine, the method comprising:

determining a desired engine torque;

determining a proposed effective operational displacement from a plurality of potentially available effective operational displacements suitable for delivering the desired engine torque, the proposed effective operational displacement being the most fuel efficient effective operational displacement among the plurality of available effective operational displacements;

determining whether there is an alternative effective operational displacement that is capable of delivering an alternative engine torque that is within a designated range of the desired engine torque with better fuel economy than would be provided by operation at the proposed effective operational displacement, the alternative engine torque being different than the desired engine torque; and when it is determined that an alternative effective operational displacement that is capable of delivering an alternative engine torque that is within the designated range of the desired torque with better fuel economy than the desired engine torque exists, determining whether the alternative engine torque is suitable for use under current operating conditions, and if so, directing operation of the engine at the alternative effective operational displacement to deliver the alternative engine torque, wherein the designated range does not exceed 5% of the desired engine torque such that the alternative effective operational displacement is capable of delivering at least 95% of the desired engine torque.

10. A method as recited in claim 9 wherein the designated range does not exceed 2% of the desired engine torque such that the alternative effective operational displacement is capable of delivering at least 98% of the desired engine torque.

* * * * *